T. J. W. ROBERTSON.
Sewing Machine.
No. 599. Reissued Sept. 14, 1858.
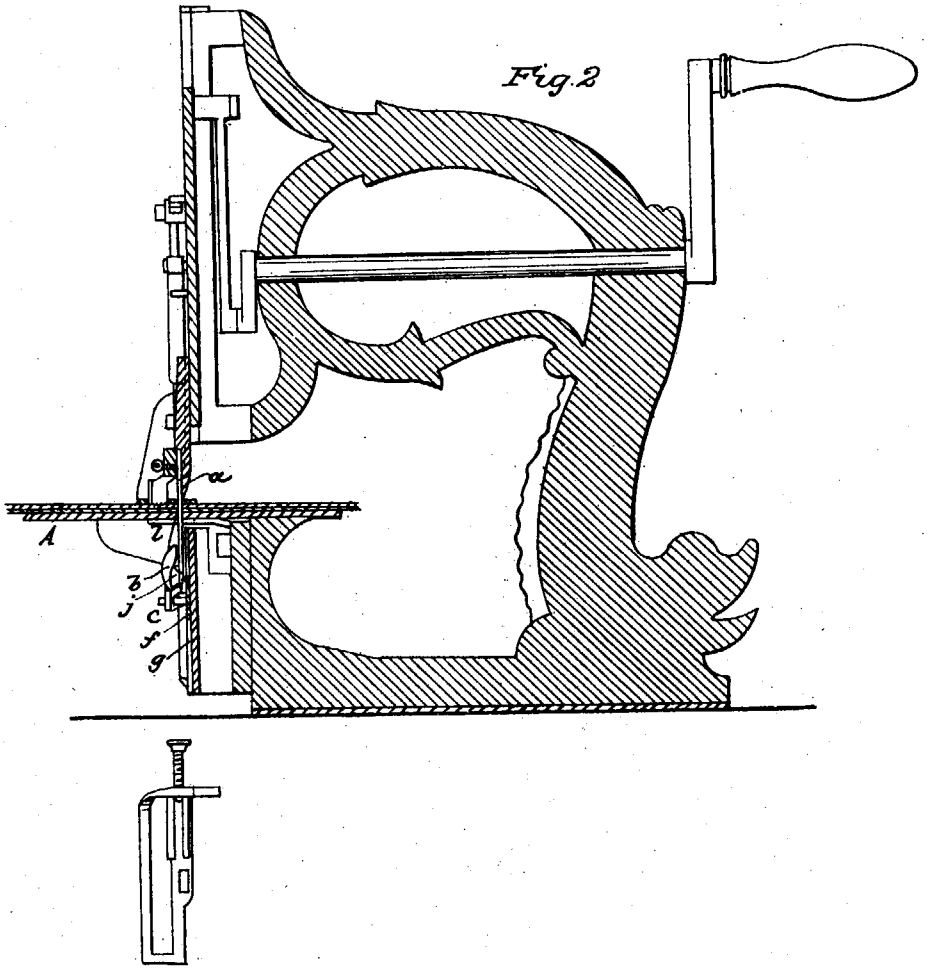
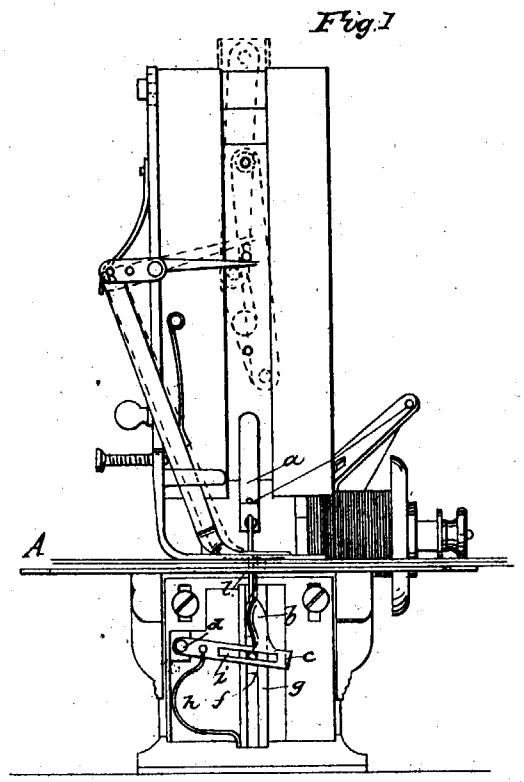
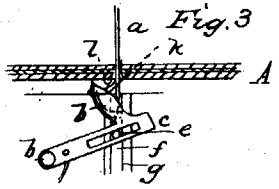
N. PETERS, Photo-Lithographer, Washington, D. C.

UNITED STATES PATENT OFFICE.

T. J. W. ROBERTSON, OF NEW YORK, N. Y.

IMPROVEMENT IN SEWING-MACHINES.

Specification forming part of Letters Patent No. 12,923, dated May 22, 1855; Reissue No. 599, dated September 14, 1858.

*To all whom it may concern:*

Be it known that I, T. J. W. ROBERTSON, of the city, county, and State of New York, have invented a new and useful Improvement in Sewing-Machines; and I do hereby declare that the following is a full, clear, and exact description of the same, reference being had to the accompanying drawings, forming part of this specification, in which—

Figure 1 is a front view of a sewing-machine with my improvement. Fig. 2 is a vertical central section of the same. Fig. 3 is a detached view of the looping apparatus, showing it in a position different to that shown in Fig. 1.

Similar letters of reference indicate corresponding parts in the several figures.

This invention consists, first, in so arranging and applying a looping apparatus on the opposite side of the cloth to that on which the needle is operated, for the purpose of completing or assisting to complete the stitch partly formed by the needle, that it may derive its motion from the needle, thereby simplifying the machine and allowing the main shaft of the machine to be worked either forward or backward without detriment to the work performed by the said machine. This part of the invention is applicable either to sewing-machines in which a single thread is used, making what is commonly known as the "chain-stitch," or it may be applied to other machines where it is capable of use.

The drawings show the application of my invention to a single-thread sewing-machine, but will serve also to illustrate its application to machines of other kinds above mentioned.

A is the cloth-table.

*a* is the needle, which carries the thread and operates in substantially the usual manner.

*b* is the looper, which takes the loop of thread formed by the needle.

It will be observed, on examining the drawings, that this looper works in such a manner as to cross the line of feed, thereby opening the loop for the needle to pass through. It is attached to a lever, *c*, which works on a pivot, *d*, which is secured in the frame or stand B of the machine a short distance below the table A. The lever *c* has a spring, *h*, applied to it in such a way as to throw up the looper as high as the under side of the table A, as shown in Fig. 3. It is provided with a slot, *i*, to receive a pin, *e*, which is secured to a slider, *f*, which works in a fixed slide, *g*, parallel with the needle. This slider *f* is provided with a small eye or ring, *j*, which is directly in line with the needle and is large enough for the point of the needle to pass through without injury, but not large enough for the needle to pass entirely through. During the great part of the descent of the needle the looper is held up by the spring *h* to the position shown in Fig. 3; but shortly before the descent terminates the needle enters as far as it can through the eye *j* of the slider *f*, and when it is allowed to go no farther it drives down the slider, whose pin *e* carries down the lever *c* far enough to throw the point of the looper *b* to the opposite side of the needle to that on which it stands when it is raised up to the table. The point of the looper works close to the needle as it passes it, and when the lever is allowed by the ascent of the needle to be raised by the spring the looper passes into and extends the loop and retains it, as shown in Fig. 3, until the needle passes and carries the thread through it to form the next loop.

The loop is opened and kept in position for the needle to pass through by running the looper in a diagonal direction to the line of feed. When the looper is run parallel to the line of feed, the loop is not opened sufficient to insure the needle passing through it with certainty, unless a sideward motion is given to said looper for the purpose of opening the loop. This applies also to those loopers or needles running at right angles to the line of feed, as they also require a longitudinal motion to take the loop from the needle and a sideward motion to open the loop for the needle to pass through. By running the looper in a diagonal direction, as in my machine, the looper not only takes the loop from the needle, but also opens the loop for the needle to pass through with one direct motion of the looper. This is a great advantage over the method of running the looper heretofore used, as it lessens the wear, friction, and power used for running the looper and requires less mechanism.

In order to prevent the closing of the looper under the sharp side of the hole *k* in the table A, through which the needle works, I provide a fixed rounded piece, *l*, for the loop to rest against. This tends to keep it open, and also to prevent it slipping over the point of the looper.

This machine can be operated by turning the shaft of the machine in either direction; or it can be operated if the shaft is detached from the needle-holder and motion imparted to said holder by the hand, when all the operations of the machine will go on exactly as before, thereby showing the motion of all the parts is derived from the needle and holder. This will be seen to be a great advantage in sewing-machines, not only enabling the machine to be operated either by the right or left hand, at the convenience of the operator, but it also very much simplifies and cheapens said machine and renders it less liable to get out of order.

What I claim as my invention, and desire to secure by Letters Patent, is—

1. So arranging and operating a looper or its equivalent that it shall derive its motion from the movement of the needle, as described.

2. Moving the looper up to and away from the needle, substantially in the manner specified.

T. J. W. ROBERTSON.

Witnesses:
JAMES ROBERTSON,
C. S. NEWELL.